US006213446B1

(12) United States Patent
Dismon et al.

(10) Patent No.: US 6,213,446 B1
(45) Date of Patent: Apr. 10, 2001

(54) EXHAUST GAS RECIRCULATION VALVE HAVING MEANS TO FREE A STUCK VALVE MEMBER

(75) Inventors: Heinrich Dismon, Gangelt; Armin Schürfeld, Meerbusch; Dieter Thönnessen, Viersen, all of (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/233,594

(22) Filed: Jan. 19, 1999

(30) Foreign Application Priority Data

Jan. 16, 1998 (DE) ........................................ 198 01 384

(51) Int. Cl.$^{7}$ ........................................ F16K 31/02

(52) U.S. Cl. .................. 251/76; 251/129.1; 251/129.16; 123/568.21

(58) Field of Search ........................ 251/129.15, 129.1, 251/129.16, 76; 123/568.11, 568.16, 568.21

(56) References Cited

U.S. PATENT DOCUMENTS

| | | | | |
|---|---|---|---|---|
| 2,324,642 | * | 7/1943 | Peterson | 251/76 X |
| 2,458,123 | * | 1/1949 | Wasserlein | 251/76 X |
| 2,612,188 | * | 9/1952 | Persons | 251/76 X |
| 2,625,178 | * | 1/1953 | Price | 251/76 X |
| 2,651,744 | * | 9/1953 | Acklin et al. | 251/76 X |
| 2,741,451 | * | 4/1956 | Welborn | 251/76 |
| 3,722,623 | * | 3/1973 | Waldecker | 251/76 X |
| 4,304,258 | * | 12/1981 | Mitchell | 251/76 X |
| 4,592,533 | * | 6/1986 | Guglielmi et al. | 251/76 X |
| 4,662,604 | | 5/1987 | Cook | 251/129.07 |
| 4,705,070 | * | 11/1987 | Eidsmore | 251/76 X |
| 5,199,392 | * | 4/1993 | Kreuter et al. | 251/129.1 X |
| 5,435,519 | | 7/1995 | Everingham | 251/129.15 |
| 5,666,932 | * | 9/1997 | Bauerle et al. | 123/568 |
| 5,724,950 | * | 3/1998 | Shino et al. | 123/568.21 X |

FOREIGN PATENT DOCUMENTS

| | | | | |
|---|---|---|---|---|
| 4338192 | | 5/1995 | (DE) . | |
| 0121374 | * | 6/1985 | (JP) | 251/76 |
| 9519497 | | 7/1995 | (WO) . | |

* cited by examiner

*Primary Examiner*—John Rivell
*Assistant Examiner*—Meredith H. Schoenfeld
(74) *Attorney, Agent, or Firm*—Ladas & Parry

(57) ABSTRACT

An exhaust gas recirculation valve in which an impact element is spaced from a head on a valve rod, in order to develop kinetic energy when activated end produce impact on the head to free a valve member which may have become stuck to the valve seat due to deposits on the seat from the recirculating exhaust gas. The impact member is activated when the engine is started and after the valve disk is free, the exhaust gas recirculation valve operates conventionally.

8 Claims, 2 Drawing Sheets

EXHAUST GAS RECIRCULATION VALVE HAVING MEANS TO FREE A STUCK VALVE MEMBER

FIELD OF THE INVENTION

The invention relates to an exhaust gas recirculation valve which controls flow of exhaust gas back to an internal combustion engine.

The invention relates in particular to such an exhaust gas recirculation valve in which the control of the flow of recirculated exhaust gas is obtained by moving a valve member off a valve seat by a regulated distance.

DESCRIPTION OF THE PRIOR ART

An exhaust gas recirculation valve is disclosed in DE 43 38 192 A 1 in which flow of engine exhaust gas back to a diesel engine is regulated as a function of operating conditions of the engine, in order to reduce NOx emissions and improve fuel consumption. For this purpose, the exhaust gas recirculation valve is arranged between the engine exhaust line and an air inlet line, preferably directly at the intake manifold. The exhaust gas recirculation valve can be actuated pneumatically or electrically. In the electrical actuator a magnetic field builds up when current is supplied to a coil to move an armature, which, in turn, acts on a valve rod to open the valve against a closing spring. In the pneumatically actuated exhaust gas recirculation valve, the valve is opened by applying suction pressure in a chamber to move a membrane connected to the valve rod. A reverse direction of operation is possible.

The valve which may be equipped with only one seat, preferably has two seats connected in series in the electrically actuated embodiment to reduce the required actuating force. For more precise flow control, which is dependent on the quantity of exhaust gas introduced into the inlet air of the engine, the valve is brought to a defined opening position by means of a potentiometer, of a positional regulation device, by an electromagnetic motor operator. In a pneumatic valve with positional feedback, the suction pressure is regulated appropriately in the operation chamber.

There occurs a deposition of carbon, lacquer and condensate in the exhaust gas recirculation valve due to the recirculation of exhaust gas, particularly when the recirculated exhaust gas is relatively cold, for example, under operating conditions in which the engine has not warmed up and in the case when the exhaust gas is cooled in heat exchangers for reduction of NOx emissions.

These residual deposits are applied to the sealing surfaces of the valve seat and the valve disk, and when the exhaust gas recirculation valve has been closed for a relatively long time, for example, during overnight parking of the vehicle, the valve disk becomes stuck to the valve seat. The adhesion of the disk to the seat exceeds by a multiple the maximum opening force of the electromagnetic or pneumatic actuator.

Thus, the valve can no longer open and its function is completely disrupted causing pollution of the environment and the need for repair.

SUMMARY OF THE INVENTION

An object of the invention is to provide means to avoid this costly and environmentally undesirable disruption of the exhaust gas recirculation system.

This object is achieved according to the invention by an exhaust gas recirculation valve comprising an inlet for recirculated exhaust gas, an outlet for supplying recirculated exhaust gas to an internal combustion engine, valve means for controlling communication between said inlet and said outlet, said valve means comprising a valve member, a seat for said valve member, a valve rod connected to said valve member and a head on said valve rod, means for moving said valve rod to control the valve member and regulate flow of the exhaust gas from said inlet to said outlet, and a device for developing kinetic energy to impact against said head and free the valve member when stuck to the valve seat.

In further accordance with the invention, a method is provided for operating the exhaust gas recirculation valve to free a valve member stuck to the valve set, by the steps comprising controlling flow of exhaust gas from an inlet of the exhaust gas recirculation valve to an engine-connected outlet thereof by regulated movement of a valve member off a seat therefor, and developing kinetic energy in a drive member when the valve member is on said seat to produce impact of the drive member on the valve member to free the valve member when stuck to the valve seat.

DETAILED DESCRIPTION

Figures 1, 2, 3:
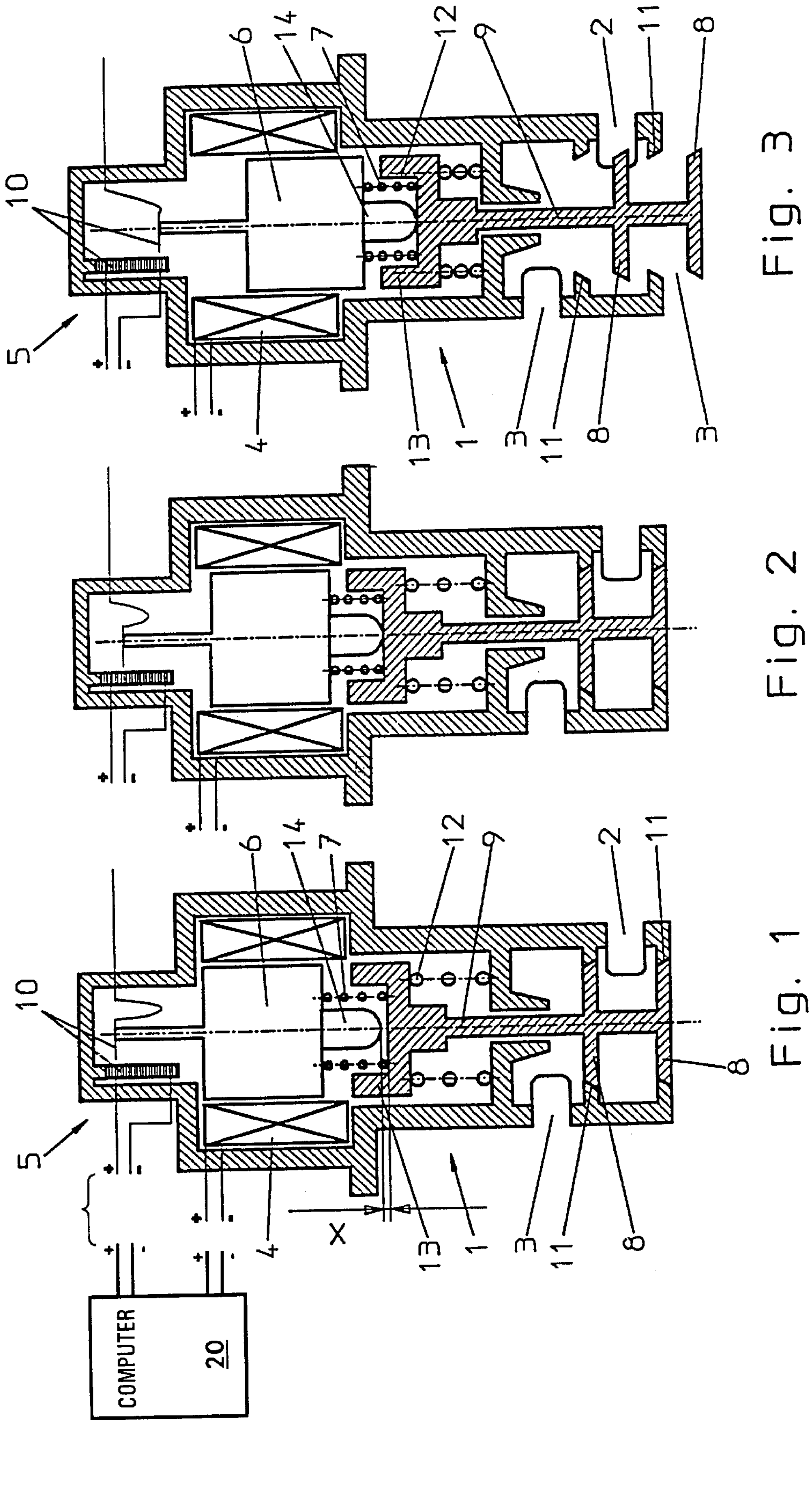
FIG. 1 is a sectional view of an embodiment of an exhaust gas recirculation valve according to the invention in a rest or closed position.
FIG. 2 shows the exhaust gas recirculation valve in an intermediate position as the valve is being opened.
FIG. 3 shows the exhaust gas recirculation valve in the opened position.

FIG. 1 shows an exhaust gas recirculation valve 1 which can be installed on a suction pipe (not shown) connected to the air inlet of an internal combustion engine. The valve 1 has an exhaust gas inlet 2 connected to a chamber to which is also connected an outlet 3 connected to the air inlet of the engine to recirculate exhaust gases thereto. Valve 1 is an electromagnetic valve and comprises a coil 4 in a head piece 5 and an armature 6 operated by energization of coil 4 to act on a valve rod 9 and displace valve disks 8 to open the valve against the action of a biassing spring 7.

Armature 6 is connected to a positional feedback, device 10 connected to a computer (20) receiving other operating parameters, to determine the degree of opening of the exhaust gas recirculation valve and thus the quantity of exhaust gas recirculated to the engine. Valve disks 8 cooperate with two valve seats 11 but the exhaust gas recirculation valve may also be designed with one valve seat and one valve disk. Valve rod 9 is urged by a spring 12 to the closed position of the valve. In order to assure an opening of the exhaust gas recirculation valve even if there is sticking between the valve disk and the valve seat, the valve operates as described below.

In the rest position, a free space or clearance, x in FIG. 1, is provided between armature 6 and head 13 of valve rod 9 under the action of spring 7 between armature 6 and head 13. If magnetic coil 4 is energized with full current instantaneously a magnetic field is rapidly produced and armature 6 is accelerated against the action of spring 7 to build up kinetic energy and impact against head 13 of the valve rod, by means of a striker 14 on armature 6. When the current is turned off, the armature retracts under the action of spring 7. By a single actuation of the armature or multiple repetitive actuations over brief intervals, the armature "hammers" the valve rod and any sticking between valve disk 8 and valve seat 11 is overcome. According to the computer program, the "hammering" can be effected continuously when the ignition is turned on, or only if it has been established that the determined position of the valve 1 has not been reached, for example, under normal, pulse width-modulated control of the electromagnet, by means of a comparison between the predetermined position of the armature and its actual position as determined by the positional feedback device 10.

Figure 4:
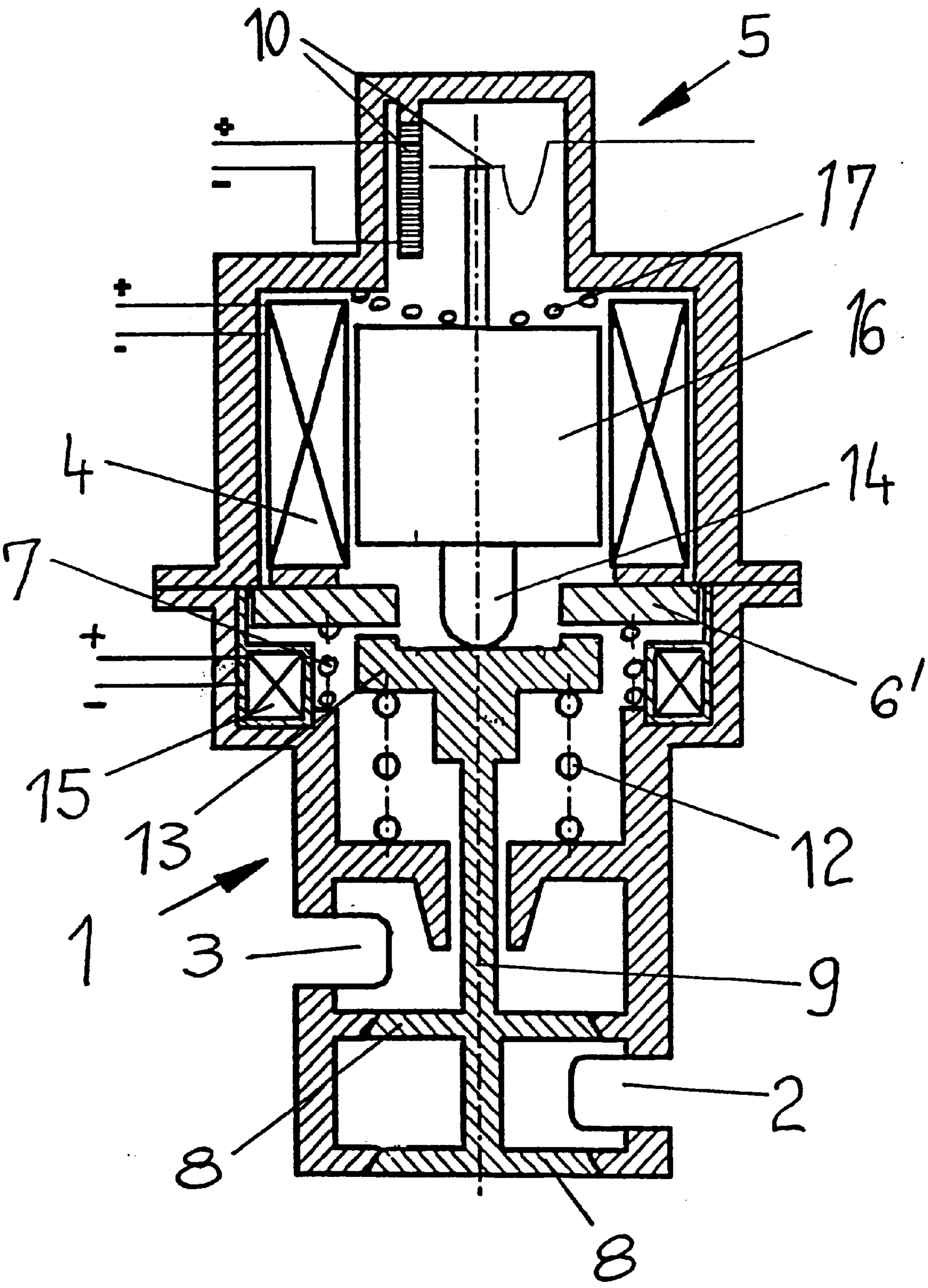
FIG. 4 shows another embodiment of the exhaust gas recirculation valve according to the invention.

FIG. 4 shows another embodiment of the exhaust gas recirculation valve according to the invention. In this embodiment, a "hammering" of the valve disks 8 is effected by a separate additional plate magnet armature 6' which is held at a distance from head 13 by spring 7. The armature 6' is actuated by a separate coil 15. Because of the spacing of the plate armature 6' from head 13, when the coil 15 is energized, the armature 6' is moved to produce kinetic energy and forceable impact with head 13 to free the disks 8 when they are stuck to the seats.

The regulated degree of opening of the valve disks to control the flow of the recirculated exhaust gas from the inlet 2 to the outlet 3 is effected by controlled displacement of head 13 by displacement of proportional magnetic armature 16 upon energization of coil 4. The armature 16 is acted on by spring 17 to urge striker 14 against valve head 13. Thereby, movement of armature 16 is directly followed by valve rod 9.

This embodiment offers the advantage that the plate magnet 6' opens the valve with high actuating forces over a short distance, whereafter control of the degree of opening of the valve is independently effected by the armature 16.

Armature 16 is thus not subjected to development of high impact forces during very short periods of time therefore promoting service life and accuracy of flow control of the recirculated exhaust gas.

The positional feedback device 10 can determine the thickness of the depositions on the valve disk and valve seat from time to time in an adaptive process step in the computer. In this way, flow control accuracy is maintained due to a corresponding consideration in the valve stroke.

In another embodiment of the invention, which is not shown, drive head 5 can be constructed as a conventional pneumatic actuator, which is divided into two chambers by a membrane which carries out the function of armature 6 or 16. In this regard the striker 14 is connected to the membrane and when the valve disks are on the seats the striker is spaced from the head 13 and when suction pressure is applied to an operating one of the chambers, the membrane deforms and causes the striker to accelerate and impact against the head 13 of the valve rod 9.

When the operating chamber is returned to normal atmospheric pressure, the membrane returns to its initial position under the action of spring 7 arranged in the operating chamber, in readiness for the next operation. The operating chamber is arranged in the drive head 5 to face valve rod 9 and the other chamber is at atmospheric pressure. In the construction with the pneumatic actuator, the unsticking operation can be effected after buildup of suction pressure following the first engine revolutions after starting the internal combustion engine. The suction pressure, however, may also be produced by a vacuum pump driven mechanically or by an electrical motor. After the unsticking of the valve disks the exhaust gas recirculation valve, whether driven electromagnetically or pneumatically, operates as a conventional valve. Then the drive head is controlled by the computer in such a way that the free space x in FIG. 1 is taken up at conventional regulating speed against the action of spring 7 so that there is no impact, between striker 14 and head 13 and the device is in the position shown in FIG. 2, in which striker 14 is in contact with head 13 and the actual adjusting of valve disks 8 commences to open the exhaust gas recirculation valve 1 and provide regulated flow of exhaust gas from inlet 2 to outer 3.

Although the invention has been described with reference to specific embodiments, it will be obvious to those skilled in the art that numerous modifications and variations can be made within the scope and spirit of the invention as defined in the attached claims.

What is claimed is:

1. An exhaust gas recirculation valve comprising:

an inlet for recirculated exhaust gas, an outlet for supplying recirculated exhaust gas to an internal combustion engine, valve means for controlling communication between said inlet and said outlet, said valve means comprising a valve member, a seat for said valve member, a valve rod connected to said valve member and a head on said valve rod, means for moving said valve rod to control the valve member and regulate flow of the exhaust gas from said inlet to said outlet, said means for moving said valve rod including an arrangement for developing kinetic energy to impact against said head and free the valve member when stuck to the valve seat, said arrangement comprising an electromagnet including an armature having an initial position spaced from said head when the valve member is applied to said seat such that when said electromagnet is energized said armature undergoes movement to develop said kinetic energy and produce impact against said head, and a control system connected to said electromagnet to operate said electromagnet repetitively to cause said armature to hammer against said head to free the stuck valve.

2. An exhaust gas recirculation valve as claimed in claim 1, comprising a positional feedback device coupled to said armature to produce a signal indicating the initial position of said armature, said control system receiving said signal from said positional feedback device to operate said electromagnet repetitively when said signal indicates that the valve may be stuck to the valve seat.

3. An exhaust gas recirculation valve as claimed in claim 1, wherein said armature includes a striker facing said head to impact thereagainst.

4. A method of operating an exhaust gas recirculating valve for an internal combustion engine to free a valve member struck on a valve seat, said method comprising:

controlling flow of exhaust gas from an inlet of the exhaust gas recirculation valve to an engine-connected outlet thereof by regulated movement of a valve member off a seat therefor, and repetitively impacting a drive member with kinetic energy against the valve member to hammer said valve member when the valve member is on said seat to free the valve member if stuck to the valve seat.

5. A method as claimed in claim 4, comprising producing a signal after starting the engine to move the valve member off said seat to a position to regulate flow of exhaust gas from the inlet to the outlet of the exhaust gas recirculation valve, determining if the valve member is to the seat and if so stuck developing said kinetic energy in the drive member to hammer the stuck valve member.

6. A method as claimed in claim 4, comprising producing a signal indicative of thickness of a deposit formed on said valve member and said seat by sensing position of said valve member when on said seat.

7. An exhaust gas recirculation valve comprising:

an inlet for recirculated exhaust gas, an outlet for supplying recirculated exhaust gas to an internal combustion engine, valve means for controlling communication between said inlet and said outlet, said valve means comprising a valve member, a seat for said valve member, a valve rod connected to said valve member and a head on said valve rod, means for moving said valve rod to control the valve member and regulate flow of the exhaust gas from said inlet to said outlet, said means comprising a first electromagnet and an associated armature which is in contact with said head and has an initial position when the valve member is applied to said seat such that when said first electromagnet is energized, said armature undergoes movement to displace said rod and open said valve, and means for developing kinetic energy to impact against said head and free the valve member when stuck to the valve seat, said means for developing kinetic energy comprising a second electromagnet, a plate magnet armature associated with said second electromagnet in facing relation with said head, and a spring acting on said plate magnet armature to provide a clearance space between said plate magnet armature and said head when the valve is seated, said plate magnet armature moving through said clearance space when said second electromagnet is energized to develop said kinetic energy to produce impact on said head of the valve rod.

8. An exhaust gas recirculation valve as claimed in claim 7, wherein said first and second electromagnets are connected to a computer which controls energization of said first and second electromagnets, said exhaust gas recirculation valve further comprising a positional feedback device coupled to said armature associated with the first electromagnet for sensing position of said armature and providing an output signal in response thereto which is sent to said computer for operating said second electromagnet.

* * * * *

UNITED STATES PATENT AND TRADEMARK OFFICE

CERTIFICATE OF CORRECTION

PATENT NO. : 6,213,446 B1
DATED : April 10, 2001
INVENTOR(S) : Heinrich Dismon, et al.

It is certified that error appears in the above-identified patent and that said Letters Patent is hereby corrected as shown below:

Title page,
Item [30], correct the priority data to read as follows:
Jan. 16, 1998 DE 198 01 384.1
Oct. 13, 1998 DE 198 48 699.5

Signed and Sealed this

Twenty-seventh Day of November, 2001

*Attest:*

Nicholas P. Godici

NICHOLAS P. GODICI

*Attesting Officer*

*Acting Director of the United States Patent and Trademark Office*